Mar. 27, 1923.
E. G. KIMMICH
1,449,760
HOSE AND METHOD OF MAKING SAME
Filed June 12, 1920
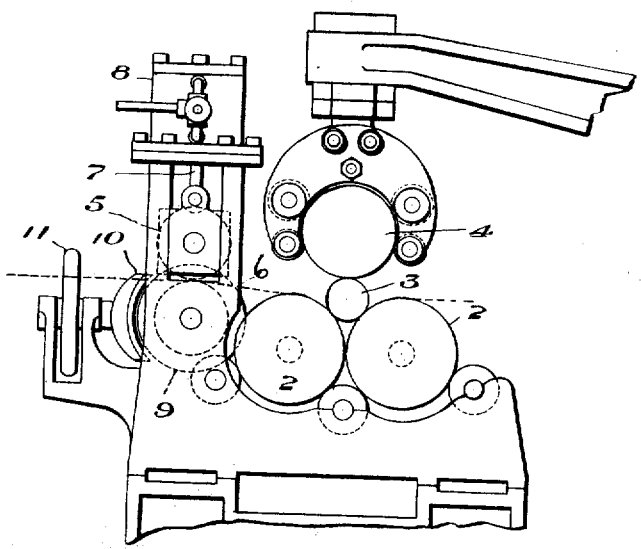
Inventor
*Elmer G. Kimmich*
By Patented Mar. 27, 1923.

1,449,760

UNITED STATES PATENT OFFICE.

ELMER G. KIMMICH, OF AKRON, OHIO, ASSIGNOR TO THE GOODYEAR TIRE & RUBBER COMPANY, OF AKRON, OHIO, A CORPORATION OF OHIO.

HOSE AND METHOD OF MAKING SAME.

Application filed June 12, 1920. Serial No. 388,565.

*To all whom it may concern:*

Be it known that I, ELMER G. KIMMICH, a citizen of the United States, and resident of Akron, Ohio, have invented new and useful Improvements in Hose and Methods of Making Same, of which the following is a specification.

The present invention relates to hose making and more particularly to improvements in methods of making hose of the so called wrapped variety, and to the article produced by practicing my method.

The prevalent procedure for making wrapped hose consists, briefly, in forming an inner tube upon a mandrel, applying a suitable number of layers of fabric upon the inner tube, covering the layers of fabric with a layer of rubber, and vulcanizing the structure thus formed.

Usually the layers of fabric are formed upon the tube from a strip (composed of bias cut sections of the fabric) of a length corresponding to the length of the hose desired and of a width sufficient to form the required number of plies, which strip is wound convolutely upon the tube with its lengthwise edge parallel to the mandrel. This type of hose is best described as bias wrapped.

In another instance the strip is cut from the original roll of the fabric in the direction of the length of the fabric and is then applied to the tube in the same manner as above described for bias wrapped hose. This type is best described as straight wrapped.

Neither in the practice of the above described, nor any other methods of making wrapped hose of which I am aware, whether manually or mechanically performed, is the application of a tension upon the fabric contemplated other than that necessary to eliminate air pockets and wrinkles between the layers and to cause them to be firmly pressed in contact with each other.

Consequently hose as commonly manufactured is possessed among others, of a certain characteristic defect, namely, the lack of load or pressure sustaining capabilities commensurate with the amount of fabric used.

Each superposed layer, or ply, obviously contains a greater amount of fabric than the preceding layer, because of the increase in diameter of the structure as it is built up. Hence, each successive layer is possessed of greater capacity for stretching, or of greater stretchability.

Consequently in a hose built to withstand a working load of say $x$ lbs. interior pressure (this of course being far short of its maximum load sustaining capacity) the inner layer or ply under the normal load is, in use, stretched to a certain point below its maximum or breaking point while the remaining plies are successively stretched to points relatively further below their respective maximum stretch or breaking point. In the event of an overload, stretching the inner ply to its maximum stretch the next ply will be stretched to a degree less than its maximum, and each succeeding ply will in like manner be stretched to a relatively less degree than its preceding ply. If the pressure is then further increased the inner ply will be broken and the entire pressure will then be exerted against the remaining plies. When the second ply reaches its maximum stretch it will also be broken, and in like manner each successive ply will be broken in turn until the entire hose is ruptured.

Therefore under either the normal, the maximum or any pressures therebetween, the inner ply is not properly reinforced or supported by the succeeding plies and an undue percentage of the pressure is sustained by this inner ply. In like manner each of the other plies sustains a greater percentage of the pressure than its succeeding ply.

It has been demonstrated that in hose as commonly constructed, each succeeding ply will break under less pressure than the preceding ply owing to the increase in diameter of each succeeding ply and the lack of mutual support of the plies. Usually therefore, after the inner ply has burst, the remaining plies will burst in rapid succession.

Heretofore attempts have been made to overcome this defect in hose as now constructed and to thereby obtain a hose of higher pressure sustaining capacity by increasing the number of plies or windings with the result that more fabric is used than is commensurate with the increase in strength obtained.

In view of the foregoing it will now be apparent that owing to this inherent increase of stretchability of each succeeding ply over its preceding ply and the consequent unequal distribution of the load upon the several plies, that the manufacturer is precluded from producing an article in which the full strength of the combined plies of fabric is utilized and is moreover prevented in a great measure from formulating any accurate estimate as to the load sustaining capacity of the hose.

It is the primary object, therefore, of the present invention, to provide a method by the practice of which the fabric used in forming a hose, of the so called "bias wrapped" or "straight wrapped" varieties may be so treated as to positively insure the production of a hose wherein each ply combines to sustain its proportionate part of the normal or an overload pressure, and wherein under the pressure of the normal load or any pressures thereabove, each ply stretches in the correct proportionate degree regardless of the number of plies or the thickness of the fabric used to form the same.

Other objects and advantages will become readily apparent when the following description is read in conjunction with the accompanying drawing in which has been diagrammatically illustrated one form of a mechanism for practicing my proposed method.

Referring to the drawing, the numeral 2 designates a pair of driven bed rolls for supporting and rotating a mandrel 3, and the numeral 4 designates a presser roll adjustable toward and from the mandrel 3 in any suitable manner and designed to exert pressure thereon, it being understood that the presser and driven rolls are substantially coextensive in length with the mandrel.

Located immediately adjacent the bed rolls 2 and corresponding in length thereto, is a pair of tension rolls 5 and 6, one of which tension rolls preferably the upper one 5, is mounted for movement toward or away from its companion roll by any suitable means, such as the pressure actuated piston and the cylinder shown in the drawing and designated respectively by the numerals 7 and 8.

Any suitable device for retarding one of the tension rollers, preferably the roller 6, may be provided, such, for instance, as the drum 9 fixed to the roller 6, the brake shoe 10 and the hand wheel 11.

In practicing the present method, an inner tube is formed upon the mandrel 3 by rolling a sheet of rubber thereon or by blowing onto the mandrel a tube previously formed, after which the tube and mandrel are placed upon the bed rolls 2, the presser roll 4 having first been adjusted away from the same.

Assuming that the tension roll 5 has been adjusted from its companion roll 6 by admitting fluid under pressure to the cylinder 8, a strip of rubberized fabric cut to correspond in length to the desired length of the hose, and of a width sufficient to form the required number of plies, is passed between said tension rolls 5 and 6, with its forward edge inserted between the mandrel 3, and the forward one of the bed rolls 2, or between the mandrel 3 and the presser roll 4 if desired. Presser roll 4 is now adjusted to bear upon the mandrel and the tension roll 5 is adjusted to bear upon the fabric and upon the companion roll 6.

As the bed rolls 2 are rotated the fabric is pulled from between the tension rolls 5 and 6, wound upon the inner tube upon the mandrel and pressed thereon by the presser roll 4. By means of the hand wheel 11, brake shoe 10 and drum 9, the tension upon the fabric is applied either continuously or intermittently by stages, and in increasing degree preferably gradually throughout any predetermined portion of the fabric the degree of increase throughout each portion being determined by the thickness and quality of the fabric, the size of the hose being made, and the position each portion will occupy in the finished hose.

By actual experiment I have found that the first ply should be wound with the application of a very slight tension practically zero, and that the tension upon each successively wound portion of the fabric may be increased gradually with satisfactory results. I have also found it advantageous not to exert a sudden increase in tension upon a portion of the fabric until a portion thereof has been wrapped to overlap the preceding ply.

I have found in forming a 7 ply hose of 1¼ inches inside diameter and using a certain commercial grade of duck that the tensions upon the material may be increased with the best results in the following ratio: first ply 1, second ply 6, and the successive plies 11, 17, 23 and 33 respectively.

It is to be understood, however, that these figures are approximate and purely illustrative; furthermore, that they will vary when materials of other grades, texture and structure are employed, or when forming hose of a different diameter or a different number of plies.

After the fabric plies have been formed upon the inner tube upon the mandrel 3, the article formed is vulcanized or if desired a covering of rubber may be formed upon the fabric plies and the article then vulcanized.

Numerous tests show that 7 ply hose of 1¼ inch inside diameter, when built by the practice of my method develop a pressure sustaining capacity of from 1400 to 1650 lbs. as compared with 850 to 1150 lbs. when built under old methods. This is an increase of approximately 50% which is obviously a marked step in the progress of the hose manufacturing art.

It will now be apparent that I have provided an improvement in methods of making wrapped hose whereby the fabric forming the plies or layers of the hose is prestretched, as it is being formed upon the inner tube, and in such a manner that the excess stretchability in each portion of the fabric comprising each separate ply, may be eliminated with a dependable degree of accuracy. Through the practice of this method an equal and balanced stretch of each ply of the fabric upon the hose, under all pressures is assured, the succeeding plies, each properly sustaining the preceding ply, and the maximum strength and value of the combined plies of fabric utilized.

While I have described certain steps and procedure as the preferred practice of my improved method, it is to be understood that certain departures from these steps may be resorted to without departing from the spirit of the invention, and that the method as set forth may be practiced with equally satisfactory results in manufacturing any type of hose embodying two or more plies of fabric or other fibrous material.

What I claim is:

1. A method of wrapping hose comprising the following steps, (a) winding flexible material into superposed plies to form a tube, and (b) adjusting each ply as it is wound to compensate for the increase of stretchability inherent in that portion of the material comprising the succeeding ply (whereby each ply will stretch to its maximum under a certain pressure within the tube).

2. The method of forming hose including the following steps, (a) winding fabric upon a tube to form superposed plies thereon, and (b) as it is wound, adjusting the fabric forming one ply to compensate for the increased stretchability of the fabric in the succeeding ply whereby said plies will stretch to their maximum under a certain pressure within the hose.

3. The method of making hose including the following steps, (a) subjecting material to a continuous tension varying in degree throughout different portions of said material, and (b) winding such material to form a body portion of superposed layers.

4. The method of making hose including the following steps, (a) subjecting material to a continuous tension increasing in degree throughout successive portions of said material, and (b) winding such material to form a body portion of superposed layers.

5. The method of making hose including the following steps, (a) subjecting fabric to a continuous tension varying in degree throughout different portions of said fabric, and (b) winding such fabric to form a body portion of superposed layers.

6. The method of making hose, including the following steps, (a) subjecting fabric to a continuous tension increasing in degree throughout successive portions of said fabric, and (b) winding such fabric to form a body portion of superposed layers.

7. The method of making hose including the following steps, (a) stretching different portions of material to different degrees, (b) winding such material to form a body portion of superposed layers.

8. The method of making hose including the following steps, (a) stretching different portions of fabric to different degrees, (b) winding such fabric to form a body portion of superposed layers.

9. The method of making hose including the following steps, (a) subjecting predetermined portions of fabric successively to a gradually increasing stretching action, and (b) winding such fabric convolutely to form a body portion of superposed layers.

10. The herein described method which includes the following steps, (a) winding fabric convolutely to form a body portion of superposed layers, (b) stretching the fabric by applying an increased amount of tension to successively wound zones of said fabric, simultaneously with the winding operation.

11. The herein described method which includes the following steps, (a) winding prepared fabric convolutely to form a body portion of superposed layers, (b) stretching the fabric simultaneously with the winding operation by applying an increased amount of tension to successively wound zones of said fabric, and (c) vulcanizing the article thus formed.

12. The herein described method which includes the following steps, (a) winding a strip of fabric upon a tube to form a plurality of plies thereon, (b) stretching the fabric as it is wound by exerting different degrees of tension upon different portions thereof.

13. The herein described method which includes the following steps, (a) winding a strip of fabric upon a tube to form a plurality of layers thereon, (b) stretching the fabric as it is wound by exerting different degrees of tension upon different portions thereof, (c) vulcanizing the article thus formed.

14. The herein described method which includes the following steps, (a) forming a tube of rubber compound, (b) winding a strip of prepared fabric upon the tube to form a plurality of plies thereon, (c) stretching the fabric as it is wound by exerting different degrees of tension throughout different portions thereof, and (d) vulcanizing the article thus formed.

15. The herein described method which includes the following steps, (a) forming a tube of rubber compound, (b) winding a strip of prepared fabric upon the tube to form plies thereon, (c) stretching the fabric as it is wound by exerting different degrees of tension upon different portions thereof, (d) covering the plies with a layer of vulcanizable material, (e) vulcanizing the article thus formed.

16. The herein described method which includes the following steps;

(a) forming a tube of rubber compound, (b) winding prepared fabric upon the tube to form a plurality of superposed plies thereon, (c) stretching the fabric by applying an increased amount of tension to successively wound zones of said fabric, as they are wound, and (d) vulcanizing the article thus formed.

17. The herein described method which includes the following steps, (a) forming a tube of rubber compound, (b) winding prepared fabric upon the tube to form a plurality of superposed plies thereon, (c) stretching the fabric by applying different degrees of tension to successively wound zones of the fabric, simultaneously with the winding operation, (d) vulcanizing the article thus formed.

18. As an article of manufacture, a hose including a body portion of superposed plies of material, the different layers of which are stretched to different degrees.

19. As an article of manufacture, a hose including a body portion of superposed contiguous plies of material, each ply being stretched to a greater degree than the preceding ply.

20. As an article of manufacture, a hose including a body portion of superposed plies of fabric, the different layers of which are stretched to different degrees.

21. As an article of manufacture, a hose including a body portion of superposed contiguous plies of fabric, each ply being stretched to a greater degree than the preceding ply.

22. As an article of manufacture, a hose including a vulcanized body portion formed of contiguous plies of rubberized fabric, each ply being stretched to a different degree.

23. As an article of manufacture, a hose including a vulcanized body portion formed of superposed plies of rubberized fabric each ply being stretched to a greater degree than the preceding ply.

24. As an article of manufacture, a hose including a vulcanized body portion formed of rubberized fabric convolutely wound upon an inner tube to form plies, each ply being stretched to a greater degree than the preceding ply.

25. As an article of manufacture, a hose including a vulcanized body portion of rubberized fabric convolutely wound upon an inner tube to form plies, each ply being stretched to a greater degree than the preceding ply, said plies being covered with a layer of rubber compound.

In witness whereof, I have hereunto signed my name in the presence of two subscribing witnesses.

ELMER G. KIMMICH.

Witnesses:
J. E. KEATING,
E. C. HADENHAM.